July 7, 1959   L. F. HAMBLIN   2,893,747
LOW-LOADER TRAILER WITH VARIABLE GROUND CLEARANCE
Filed Dec. 4, 1956   5 Sheets-Sheet 1
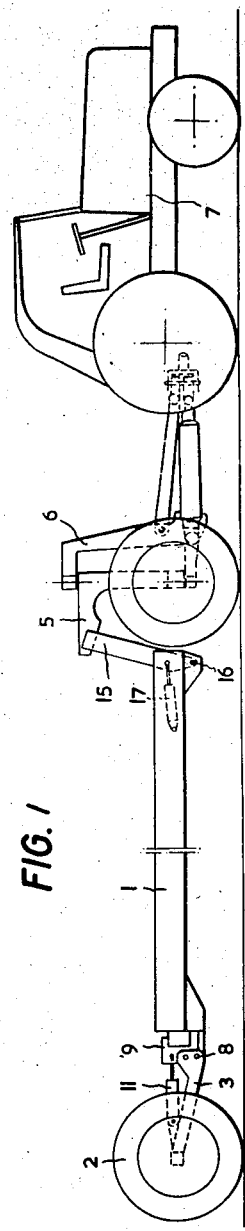
INVENTOR
LESLIE FRANK HAMBLIN
by Walter S. Pleston
ATTORNEY

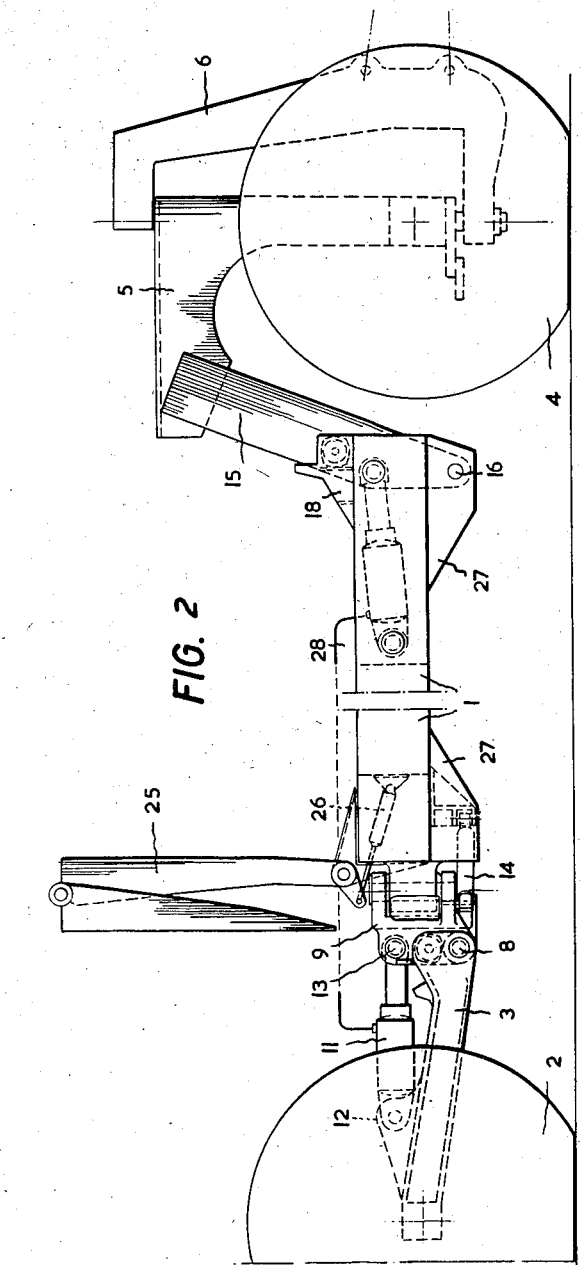

July 7, 1959 L. F. HAMBLIN 2,893,747
LOW-LOADER TRAILER WITH VARIABLE GROUND CLEARANCE
Filed Dec. 4, 1956 5 Sheets-Sheet 3
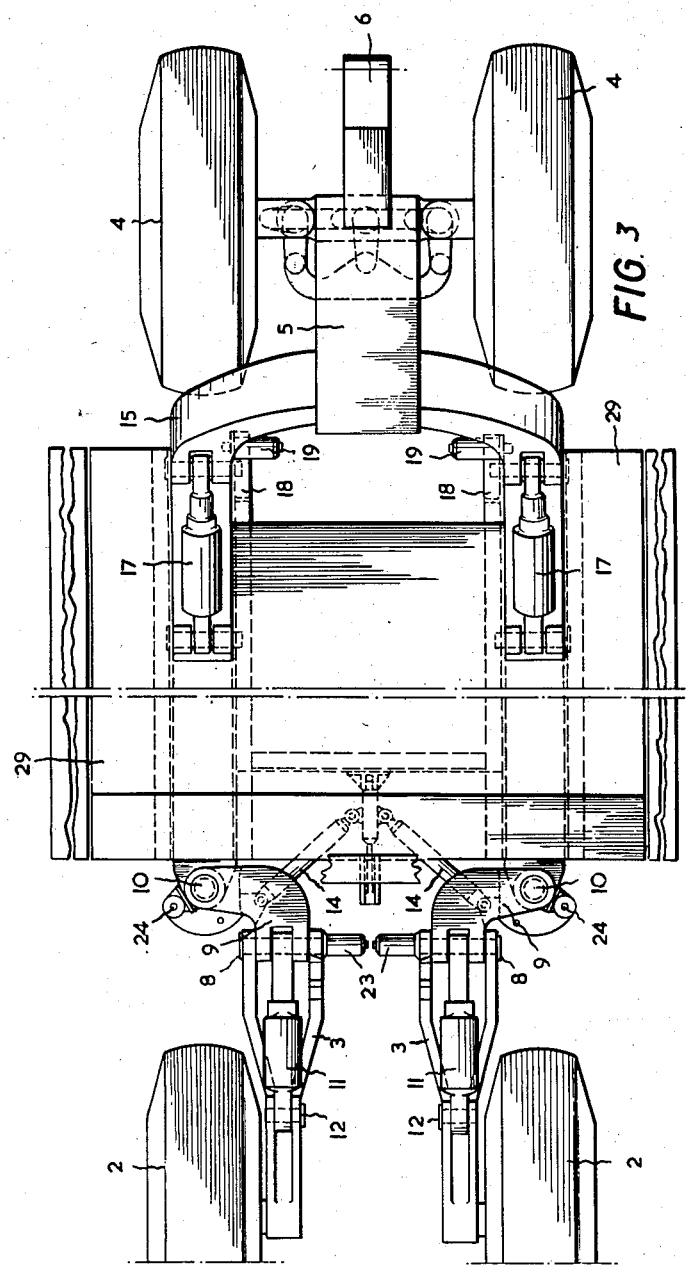
INVENTOR
LESLIE FRANK HAMBLIN
by Walter S. Pleston
ATTORNEY

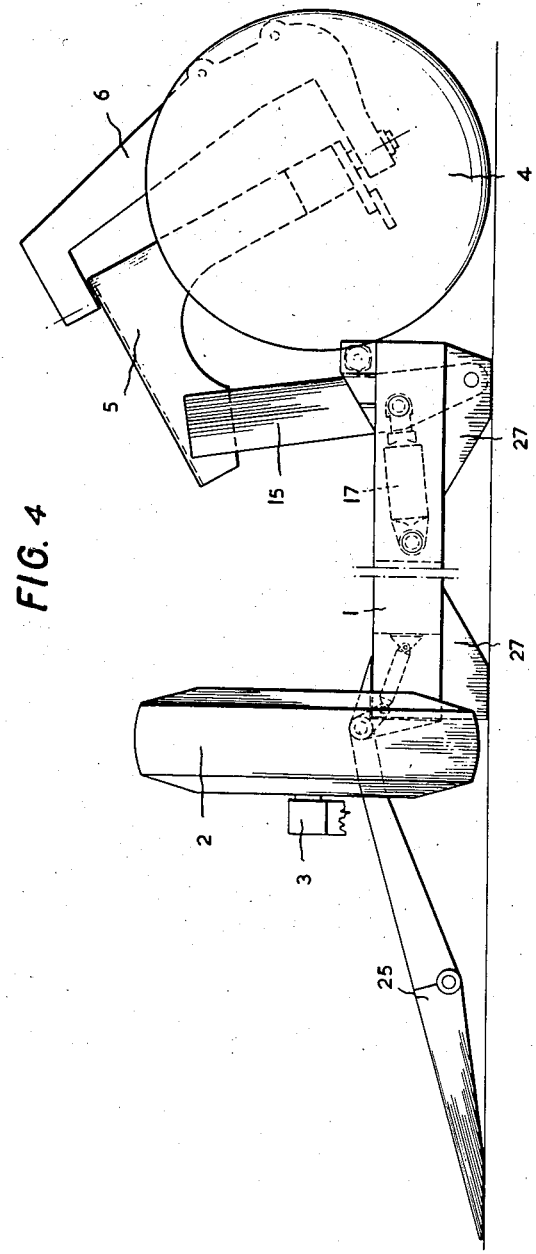

July 7, 1959　　　　　　　L. F. HAMBLIN　　　　　　2,893,747
LOW-LOADER TRAILER WITH VARIABLE GROUND CLEARANCE
Filed Dec. 4, 1956　　　　　　　　　　　　　　　　5 Sheets-Sheet 5
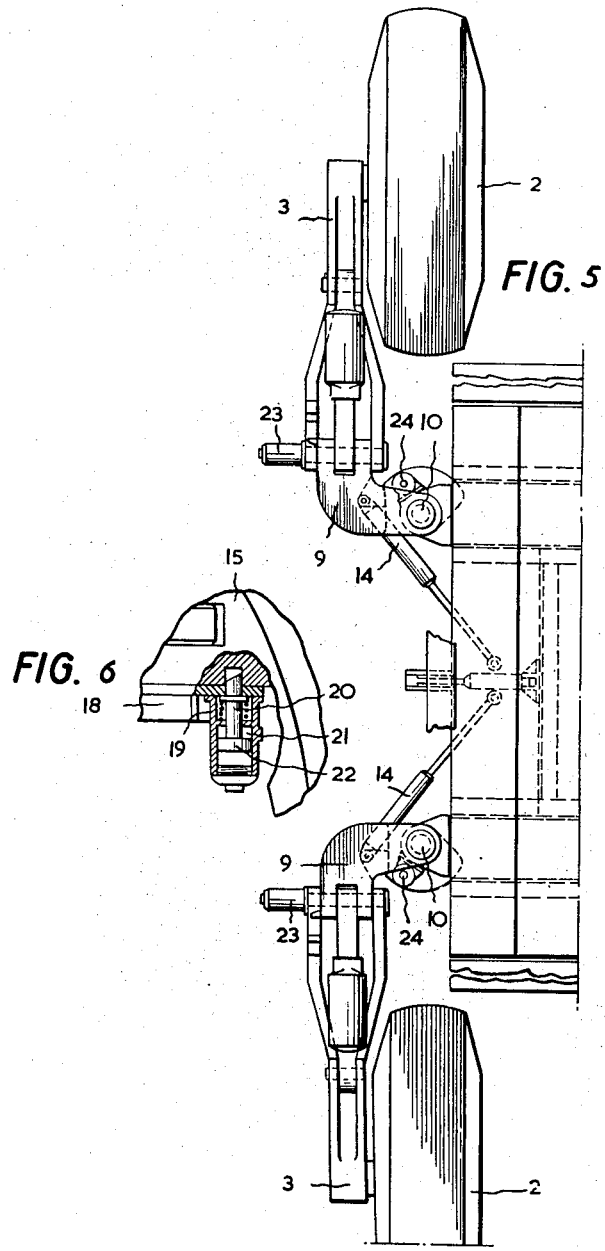
INVENTOR
LESLIE FRANK HAMBLIN
by Walter S. Pleston
ATTORNEY

United States Patent Office 2,893,747
Patented July 7, 1959

2,893,747
LOW-LOADER TRAILER WITH VARIABLE GROUND CLEARANCE

Leslie Frank Hamblin, Marchamley, near Shrewsbury, England, assignor to Sentinel (Shrewsbury) Limited, Shrewsbury, England, a British company Application December 4, 1956, Serial No. 626,131

Claims priority, application Great Britain December 7, 1955

1 Claim. (Cl. 280—44)

This invention relates to trailers of the low-loader class, i.e. of the kind designed to take heavy loads on a platform between the wheels, the upper surface of the platform generally being well below the tops of the wheels to keep the centre of gravity of the vehicle low, and to make loading of the vehicle as easy as possible.

In order further to simplify loading of the trailer, it is known to remove the entire rear axle and lower the rear end of the trailer to the ground, so that the load can be winched on from the rear. This means, however, that the platform is inclined and, of course, the trailer cannot then be moved.

A disadvantage of present low-loaders is that their design must necessarily be a compromise since, whilst it is desirable to keep the centre of gravity low for obvious reasons, there must at the same time be adequate ground clearance below the platform, and this presents a considerable problem where hump-back bridges and large road cambers have to be negotiated with a trailer of, possibly, thirty or forty foot wheelbase.

It is proposed according to the present invention to make all the wheels of a low-loader trailer vehicle adjustable vertically at will with respect to the platform.

In this way the platform can be raised to give adequate ground clearance where necessary to negotiate humps, and can also be lowered to the very minimum clearance to reduce the total height when passing under low bridges or through doorways of limited height. Furthermore, the whole platform can be lowered evenly to the ground and is then in a stable and level position for loading or unloading.

The wheels may be carried on trailing or leading arms which can be moved angularly about their pivots by hydraulic rams or by other means to raise and lower the wheels. If the front wheels are carried on a separate sub-assembly, for example, a swan-neck, then that may be pivoted to the platform and actuated by rams to raise and lower the whole sub-assembly.

Means may be provided to ensure that the wheels at the front and at the rear move together, so that the platform is parallel to the ground at all times. For example, where the actuation is by hydraulic rams, the exhaust side of the ram or each ram at the front may be in communication with thhe pressure side of those at the rear, so that actuation of the front rams displaces fluid from them to actuate the rams at the rear.

To enable wide loads to be shifted onto the trailer from the rear, the rear wheels may have, in addition to the vertical movement, a lateral outward movement which brings them out beyond the sides of the trailer. In this way the trailer can accept from the rear loads which are as wide as, or even wider than, the platform itself.

An example of a low-loader trailer embodying the invention will now be described with reference to the accompanying drawings, in which:

Figure 1 is a side elevation of the trailer in position behind a tractor for towing;

Figure 2 is a side elevation of the trailer alone to a larger scale;

Figure 3 is a plan view of the trailer with the loading ramp omitted;

Figure 4 is a side elevation of the trailer with the platform lowered to the ground and ready for loading;

Figure 5 is a plan of the rear end of the trailer in the loading position; and

Figure 6 is a detail view to a larger scale, of the locking mechanism for the swan-neck structure shown in Figure 3.

The trailer comprises broadly a rectangular steel load-carrying platform 1 supported at its rear end on rear wheels 2 carried on trailing arms 3, and at its front end by steerable wheels 4 carried on a swan-neck structure 5. A yoke 6 pivoted about a vertical axis to the structure 5 forms a towing member by means of which the trailer can be attached to a tractor 7.

Each of the trailing arms 3 is connected to pivot about a horizontal axis 8 on a corresponding knee member or bracket 9, each bracket being pivoted to the corresponding rear corner of the platform 1 about a vertical axis 10. It will be seen that the brackets 9 are cranked in a horizontal plane so that they are directed inwards from their pivots 10. In this way the trailing arms 3 lie inboard of the wheels 2 which, carried on outwardly directed stub axles, still lie within the overall width of the vehicle as ready for the road.

A hydraulic ram 11 is connected between a lug 12 on the upper side of each arm 3 and a pivot 13 on the corresponding bracket 9 above the horizontal axis 8, so that actuation of the rams will raise or lower the arms 3 with respect to the platform 1 and accordingly lower or raise the rear end of the platform with respect to the ground.

Further rams 14 connected between the platform 1 and the brackets 9 can swing the arms 3 outwards in a horizontal arc about the axes 10 to bring them to the position shown in Figure 5.

At the front end of the platform 1 the swan-neck structure 5 embodies an inverted U member 15 by means of which it is pivoted to the platform at points 16 about a transverse horizontal axis. Hydraulic rams 17 are connected between points on the platform 1 and points on the limbs of the member 15 above the points 16. Actuation of the rams 17 will raise or lower the swan-neck structure with respect to the platform 1 and accordingly lower or raise the front end of the platform with respect to the ground.

Hydraulically withdrawn mechanical locking plungers 19 located on brackets 18 on the front end of the platform 1 are designed to move outwards to engage corresponding recesses in the sides of the limbs of the inverted U member 15, as indicated at 19 in Figure 6. A spring 20 urges the plunger into the recess and the end of it is chamfered so that it enters the recess automatically when, during angular movement of the swan-neck structure about the points 16, the recess comes opposite the plunger, this being at the point where the platform is at the normal height for road travel. Before the platform can be raised or lowered hydraulic pressure fluid must be admitted to the space 21 behind a piston 22 to withdraw the plunger.

There are similar locking arrangements 23 for the trailing arms 3 carrying the rear wheels and at 24 for the traverse movements of the brackets 9.

A two-part jack-knifing ramp 25 is hinged to the rear end of the platform 1, and is raised and lowered by a hydraulic ram 26.

During normal travel with a load the trailer has its wheel height adjusted to give a reasonable normal ground clearance. This can, however, be increased when required, to negotiate humps, by moving the rear wheel arms 3 and the swan-neck structure 5 downwards by means of the hydraulic rams 11 and 17. Conversely, when passing under low bridges, the wheels can be raised with respect to the platform 1 until the latter is almost touching the ground.

For loading or unloading, the platform 1 is lowered right to the ground, resting on feet 27, and the rear wheels 2 continue to rise until they are clear of the ground. Then the rams 14 are actuated to swing the rear wheels outwards and allow the jack-knife ramp 25 at the rear of the platform to be unfolded to the rear by the ram 26. As the brackets 9 and the vertical pivots 10 about which they swing lie wholly below the level of the top surface of the platform 1, the load can be as wide as the platform itself.

It will be appreciated that the load only has to be lifted up the ramp to a height above the ground approximately equal to the depth of the platform and feet, the latter being determined solely by considerations of strength.

To ensure that the front and rear of the platform 1 always remain at the same level, the hydraulic rams 17 and 11 at the front and rear respectively may be interconnected as follows: the pressure fluid is supplied to one side of the piston in each front ram 17 and the space on the other side of the piston is in communication through a pipe 28 (Figure 2) with the pressure side of the corresponding ram 11 at the rear. Then as the piston of each front wheel ram moves it displaces fluid into the corresponding rear wheel ram, and the two thus keep in step.

The sequence of operations of the different rams may be made automatic by suitable interconnection and by actuation of valves controlling one ram in dependence on movement of another.

The platform may be provided with lateral extensions 29 (Figure 3) which make it project beyond the wheels but which can be folded down or up or otherwise withdrawn when desired. In this way the trailer can be used to take a wide load to its destination but can be reduced in width for the return journey to comply with legal regulations limiting the speed of vehicles of greater than a prescribed width.

I claim:

A low-loader trailer vehicle comprising a platform having front and rear ends, first and second brackets, said brackets being pivotally connected to the rear end of said platform about respective vertical axes, first and second trailing arms, said trailing arms being pivotally connected to said brackets respectively about horizontal axes, load-supporting wheels mounted for rotation on said trailing arms, first fluid pressure means acting between each of said brackets and said platform and second fluid pressure means acting between each of said trailing arms and its corresponding bracket.

References Cited in the file of this patent
UNITED STATES PATENTS

| | | |
|---|---|---|
| 2,502,309 | Byrd | Mar. 28, 1950 |
| 2,513,855 | Fogwell | July 4, 1950 |
| 2,653,827 | Manning | Sept. 29, 1953 |
| 2,681,811 | Green | June 22, 1954 |
| 2,798,729 | Paul | July 9, 1957 |

FOREIGN PATENTS

| | | |
|---|---|---|
| 475,232 | Great Britain | Nov. 16, 1937 |